SUPERCONDUCTIVE CIRCUIT

Filed March 6, 1969 3 Sheets-Sheet 1

INVENTOR
JEAN SOLE

BY
Craig, Antonelli, Stewart & Hill
ATTORNEYS

INVENTOR
JEAN SOLE

BY Craig, Antonelli, Stewart & Hill
ATTORNEYS

Feb. 9, 1971 J. SOLE 3,562,684

SUPERCONDUCTIVE CIRCUIT

Filed March 6, 1969 3 Sheets-Sheet 3

INVENTOR
JEAN SOLE

BY Craig, Antonelli, Stewart & Hill

ATTORNEYS

3,562,684
SUPERCONDUCTIVE CIRCUIT

Jean Sole, Clamart, France, assignor to Commissariat a l'Energie Atomique, Paris, France Filed Mar. 6, 1969, Ser. No. 804,853
Claims priority, application France, Mar. 15, 1968, 143,930, 143,931
Int. Cl. H01f 7/22
U.S. Cl. 335—216 10 Claims

ABSTRACT OF THE DISCLOSURE

A superconductive circuit, characterised in that it comprises at least one winding of a conductive element of superconductive material having an outer electrically insulating sheathing, the said element being in the form of a continuous hollow tube in which a cooling fluid flows in the immediate vicinity of the said superconductive material and a member for electrically connecting the ends of the said element, said member connecting the said ends by their outer surface where there is no sheathing and leaving the inlet and outlet for the said cooling fluid for the said element independent of one another.

This invention relates to a superconductive circuit intended more particularly for trapping electrical power in the form of a current flowing in the said circuit and creating a magnetic field across the same, and for transferring such power to an external circuit without any appreciable losses.

It is well known that the conductive elements used for making conventional superconductive coils usually consist of a material in the form of a wire, cable, strip etc. which is adapted to have a substantially zero electrical resistance under specific temperature and magnetic field conditions. These coils are generally brought to the very low temperature required by immersing them in a bath of liquid gas, more particularly liquid helium, the entire electrical conductor, its insulators and its supports being immersed. This results in a number of disadvantages, the major ones of which are as follows: firstly, immersion of the conductive element does not always allow effective cooling throughout, particularly if the element is of appreciable section or thickness, because of the current density that it must withstand. Also, this cooling process does not give good thermal stability of the conductive element and is not always adapted to prevent local and accidental transitions of the constituent material from the superconductive to the normal state. Moreover, the quantities of liquid gas required for suitably cooling a coil may become very considerable because of the size of the latter.

In order to limit this latter drawback to some extent, it has been proposed to construct special cryostats adapted to the form of each coil in order to reduce the volume of liquid gas required. In such cases, however, when the cryostat walls are very close to the coil, electromagnetic couplings may be set up, and may have disturbing effects. Also, when the power stored in the coil is rapidly released by the controlled opening of the circuit, induced currents occur in the walls of the cryostat and result in adverse heating with a considerable cold loss. Furthermore, the proximity of the cryostat and coil walls may possibly cause breakdown with possible damage to the apparatus. In all cases, the cold volume equal to that of the coil plus that of the liquid gas inevitably presents a large radiation surface which introduces considerable thermal losses which are also due to convection of the liquid gas in the cryostat. Another drawback, finally, is due to the considerable thermal inertia of the conventional method of immersion in a bath of liquid gas, taking into account the cooling required not only for the superconductive material but also for the insulators and other members or elements associated therewith.

In superconductive circuits used more particularly for storing and releasing electrical power, it is also known that the turns of the coil windings must be insulated from one another. In such cases it is not possible to use a sheath of a non-superconductive metal which, at low temperature, has a non-zero electrical resistance and therefore acts as an insulator with respect to the superconductive circuit itself. The reason for this is that during release of the stored power the metal sheathing short-circuits the coil turns and because of its low electrical resistance would produce a very long time constant which would prevent any rapid discharge. The need to use a material which provides electrical insulation of the windings irrespective of the temperature is essential in this specific application and therefore introduces an additional unfavorable factor as regards cooling of the superconductor. The reason for this is that the insulating materials which are most common and which consists of plastics, glass, certain textile fibres or resins, are also poor heat conductors and do not therefore allow the liquid gas bath effectively to cool the superconductive material itself through the insulator.

The present invention relates to a superconductive circuit which obviate the above disadvantages, and provides effective cooling of the superconductive material throughout with minimum cold losses for the cryogenic fluid used. It also allows the use of very high current densities in the circuit and this in turn makes it necessary to have an extremely effective electrical insulation between the turns of the windings or coils in the circuit and because of the nature of the conventional materials which can be used for this insulation such electrical insulation in the prior art solutions would prevent appropriate cooling of the superconductive material by the cryogenic fluid flowing externally around the said insulator.

It is also known to make power transmission conductors which utilize the properties of superconductivity and the cooling of which is carried out by an internal flow of coolant, e.g. liquid helium. This arrangement cannot be applied to a power storage system in which the circuit must be closed, since it prevents such a flow.

The present invention obviates this problem and eliminates the above-mentioned disadvantages.

To this end, the superconductive element according to the invention is characterised in that it comprises at least one winding of a conductive element of superconductive material having an outer electrically insulating sheathing, the said element being in the form of a continuous hollow tube in which a cooling fluid flows in the immediate vicinity of the said superconductive material, and a member for electrically connecting the ends of the said element, said member connecting the said ends by their outer surface where there is no sheathing and leaving the inlet and outlet for the said cooling fluid for the said element independent of one another.

In such a circuit in which the ends of the conductive element are held in contact by their external surface and thus brought to the same electrical potential, there is a total separation of the actual electrical part and the part intended for bringing the superconductive material to the appropriate temperature, because the cooling fluid flows inside the actual conductive element.

Advantageously, the ends of the circuit are connected to a self-contained cooling fluid generator. Also, the said ends are preferably connected by an electrical junction consisting of two halves which are secured or welded by a metal which is a good electrical conductor.

With this specific arrangement, the conductive element of superconductive material may without any disadvantage have an external sheathing consisting of an electrical insulator whose thickness may be as great as required by the conditions of use, such electrical insulator preferably being an excellent thermal insulant. In such cases, the insulating sheathing effectively protects the external surface of the conductive element from any cold losses by making any heat exchange with the exterior practically impossible. Cooling of the superconductive material may therefore be carried out much more completely and more uniformly over the entire length of the conductive element, the thermal stability of which is also greatly increased.

Advantageously, the flow of the cooling fluid inside the conductive element is a forced flow, the fluid coming from a cryogenic generator connected to the ends of the said element.

The advantages of the method according to the invention will be immediately apparent. The amount of cooling fluid flowing in direct contact with or in the vicinity of the superconductive material requiring cooling may be considerable, particularly when there is a forced flow. This effect is increased further if the fluid used is liquid helium which has superfluidity properties at temperatures below approximately 2.2° K. More particularly, if the helium is at 1.85° K., the respective densities of the normal part and of the superfluid part being equal, it becomes possible to obtain optimum cooling conditions. It is also possible to control not only the rate of flow of the fluid but also its pressure and temperature, more particularly to provide precise regulation of the temperature of the superconductive material. Also, the features of the invention can be applied so rapidly that they can instantaneously accelerate or slow down the cooling of the superconductor and provide a continuous low-power state of operation or control the speed of temperature resumption.

Another advantage is due to the fact that the conductive element made from superconductive material is thus used under optimum conditions since all the turns of the winding are individually cooled throughout and identically to one another irrespective of their position in the winding. Also, any accessory components (supports, switches which require cooling at the same time as the superconductor, are reduced as far as possible since cooling involves mainly the operative part of the conductive element, i.e. the superconductive material beneath its outer insulating sheath. The amount of cryogenic fluid required may also be reduced to a minimum since the volume requiring cooling is also reduced. Consequently there is a considerable saving in the consumption of this fluid.

Finally, in a superconductive circuit according to the invention, the conductive elements or, more generally, the windings formed therewith may easily be disposed in a chamber which, if required, is evacuated and the walls of which are to some distance from said windings, without such arrangements resulting in an increased consumption of the cooling fluid. The reason for this is that because of the vacuum the radiating cold surfaces are directly those of the coils covered with the electrical and thermal insulant and not the walls of the chamber, which have much larger surface areas than those of the coil. Advantageously, the same cryogenic fluid can be used to cool heat shields suitably disposed between the coils and the walls so as to reduce still further the heat flow from outside. At all events, the cryogenic losses conventionally occurring as a result of convection of the cooling fluid between the cold and hot parts of the equipment are also completely avoided.

Various modified embodiments can, of course, be considered for the production of the conductive elements from superconductive material to form the circuits in question.

In a first modification, the said conductive element is in the form of a hollow tube of superconductive material covered on the outside by a sheath of an electrical and thermal insulant and the inner surface of which is in contact with a cylindrical cover consisting of a metal having a high coefficient of thermal conductivity, the said cover bounding an axial duct intended for the flow of cooling fluid. The presence of this conductive cover has, for example, the advantage of improving the thermal stability of the element. The cooling fluid flowing in the axial duct is in permanent contact with a material which is a good conductor and which uniformly distributes the cold towards the superconductive material and facilitates the evacuation of the heat released in the metal of the inner cover in the event of local and accidental transition of the superconductor. Another advantage is that in this embodiment the tube of superconductive material provides a uniform distribution in a region in which magnetic induction produced by the current flowing therethrough during operation is at a minimum and much less than that which would occur if this material were concentrated on itself in the form of a wire of solid cable. Also, the inner metal cover having a high coefficient of thermal conductivity is always in a region which is subjected solely to penetrating magnetic induction extending through the tube of superconductive material. Since the current is localised in the peripheral superconductive tube, then by the Maxwell-Ampere equation, the magnetic induction is, of course, theoretically zero inside this tube. However, a small magnetic induction of the penetration type continues to exist because of the induction of the adjacent currents in the thin layers, which do not have a strictly zero electrical resistance. This penetration induction is of itself very small and also limits the magneto-resistance of this cover which is then also used under optimum conditions.

In another modified embodiment, the said conductive element comprises a hollow tube of superconductive material covered on the outside by an electrical and thermal insulant surrounding a solid core of a metal having a high coefficient of thermal conductivity, said core being formed with a number of parallel bores intended for the flow of cooling fluid. In this case, these bores offer the fluid a greater contact surface with the metal which is a good conductor and which is itself covered by the tube of superconductive material. Also, these bores allow variable flows and, more particularly, in opposite directions in adjacent bores.

Of course, irrespective of the embodiment used, the conductive elements employed to form a superconductive circuit according to the invention may be obtained by production or machining methods which are themselves conventional, more particularly co-drawing or the like, or by successively depositing materials on an initial tubular element by evaporation in vacuo, cathode sputtering or by spraying with a plasma torch, or electrolytically or chemically or by a combination of these various methods. The superconductive materials may consist of niobium and titanium based alloys or niobium and zirconium based alloys, or compounds such as $Nb_3Sn$, or more generally, any other material having superconductive properties and appropriate to the use of the above-mentioned production processes. The electrical and thermal insulating sheath surrounding the outside of the superconductive material may consist of any conventional material provided that it does not undergo deterioration at low temperature or as a result of successive temperature variations, and such material can be put in place by any known technique appropriate for the construction of the insulation of conventional electrical conductors. Finally, of course, the conductive element made from superconductive material may have any section, circular or other section, both externally and internally.

The various features and modified embodiments described above will be more clearly apparent from the following description of a number of examples which are given by way of illustration without any limiting force.

Figure 1:
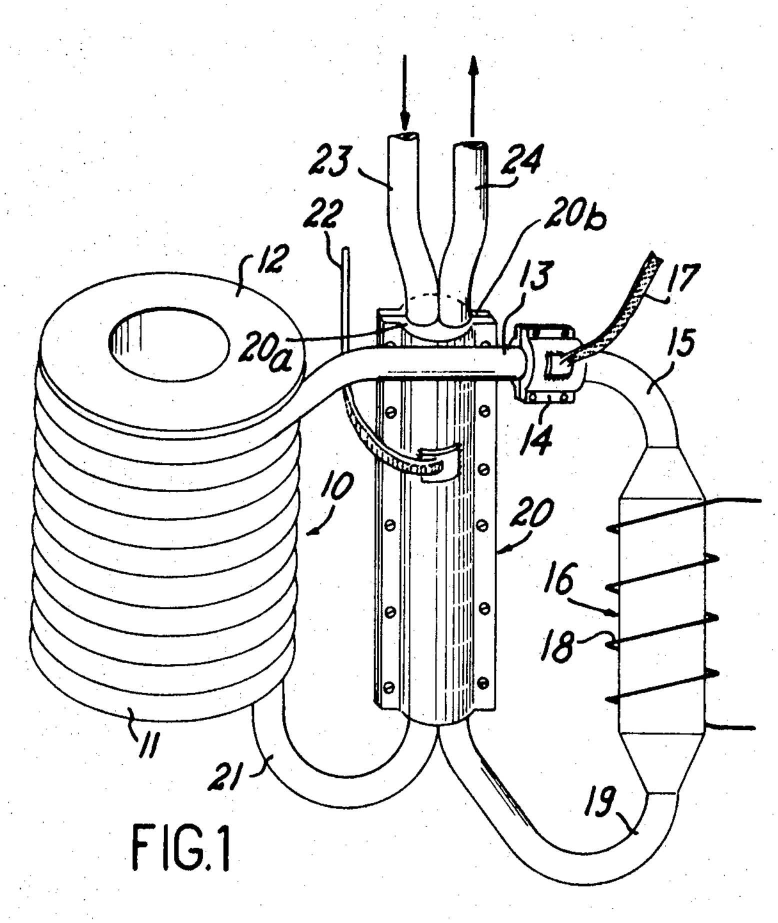
FIG. 1 illustrates a superconductive circuit according to the invention intended more particularly for storing and then releasing electrical power to an external circuit by means of direct electrical connections.
Figure 2:
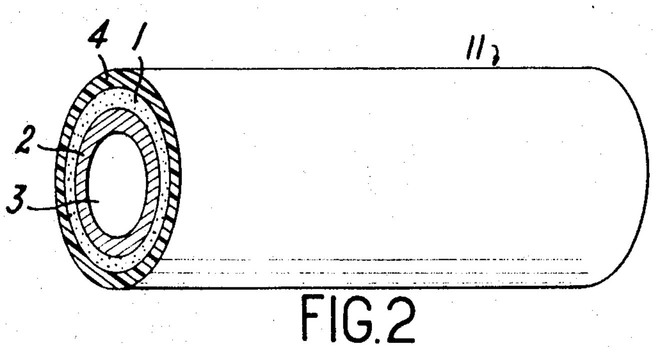
FIGS. 2, 3 and 4 are perspective views of conductive elements of superconductive material having an external insulating sheath which may be used more particularly for the construction of the circuit according to FIG. 1.

FIG. 1 illustrates a superconductive circuit formed by a winding or coil 10 of a conductive element 11 formed from a tube of superconductive material externally sheathed in an electrical insulator and, if desired, having on the inside a hollow cover or a core of a metal which is a good heat and electrical conductor bounding one or more ducts for the flow of a fluid for cooling the superconductive tube. Thus, and as shown in FIG. 2, the conductive element 11 may comprise a tube 1 made from a suitable superconductive material, the inner surface of which is in contact with a second tube 2 made from a material having a high coefficient of thermal conductivity, such as copper in particular. On the inside, this tube 2 bounds an axial duct 3 for the flow of a cooling fluid, more particularly liquid helium, which is intended to bring the tube 1 below its critical temperature at which the superconductivity properties occur. The conductive element 11 also has an outer layer 4 of an electrical and thermal insulating material, which surrounds the tube 1 and protects it from the outside atmosphere.

Figure 3:
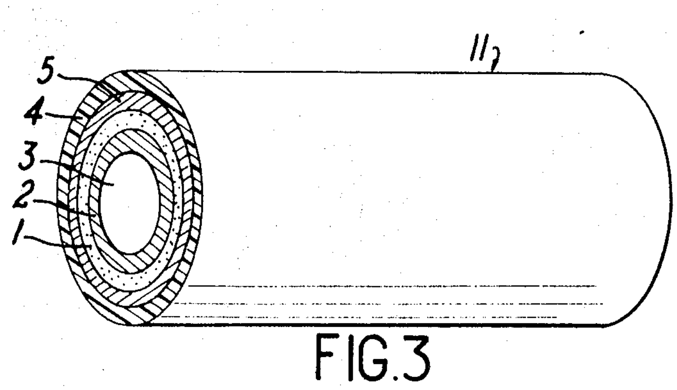

The modification illustrated in FIG. 3 is a similar arrangement to that shown in FIG. 2 with the various coaxial tubes 1, 2 and 4. In this modification, however, the tube of superconductive material 1 is in turn covered by a thickness 5 of a material which is a good conductor and which may be the same as the material of the tube 2. This layer 5 is intended more particularly to facilitate any electrical connection required between a plurality of lengths of the conductive element by soldering or welding or any other conventional process at uncovered points of the insulating layer 4, as will be explained hereinafter in connection with FIG. 6. Of course, other modified embodiments are possible arising directly out of the foregoing embodiments, wherein the conductive element 11 would be formed by a series of alternate layers of superconductive material and a metal which is a good thermal and electrical conductor, the whole being surrounded on the outside by a protective insulating sheath.

Figure 4:
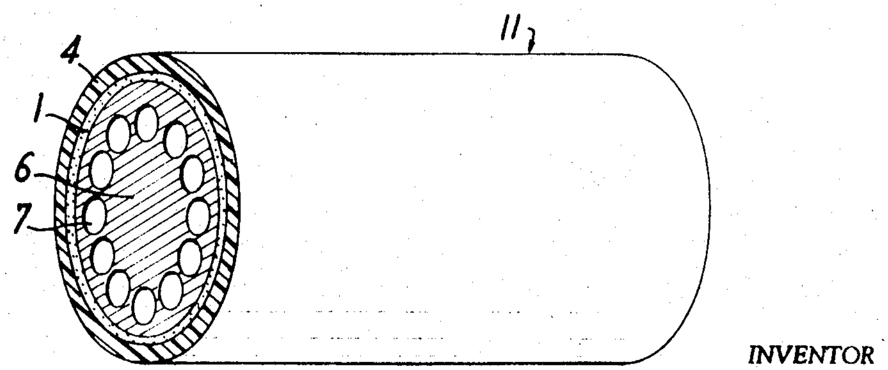

In the modification shown in FIG. 4, the superconductive tube 1 provided with its insulating sheath 4 has a solid core 6 on the inside, said core having a high coefficient of thermal conductivity. The core has a series of bores 7 which are parallel to one another and intended for the flow of a cooling fluid for the superconductive tube. If desired, these bores may carry flows in opposite directions.

The element 11 made according to any of the foregoing modifications is wound on an insulating frame 12 made from glass fibres embedded in a resin and one of its ends 13 leads to a junction member 14 providing a connection to another conductor 15 of the same structure, which is connected to one of the terminals of a superconductive switch 16. The junction member 14 preferably consists of a metal clamping collar, more particularly of copper, which if required is welded or soldered by indium at the end 13 in a region of the conductive element where there is no insulating sheathing, or reinforced mechanically by a stainless steel fitting which locks the collar. A connecting lead or cable 17 is brazed to the junction member 14 before assembly. The superconductive switch 16 comprises an outer electrical winding 18 which in known manner controls the electrical making or breaking of said switch, by effecting the transition from the superconductive state to the normal state, or vice versa, of the material from which it is made. Like the conductor 11, the switch is made from a tubular element or superconductive layer in which the cooling fluid flows freely.

With this arrangement, and for a given current flowing in the superconductive layer with current lines parallel to the axis of the cylinder formed by this layer, it will be found that the induction, which is inversely proportional to the radius of the layer, is much lower than if the superconductive material forming the layer were connected to form a solid cylinder and, more particularly, a wire or cable. It is therefore possible for the superconductive layer of this switch to carry much higher currents, the critical current density increasing with reducing magnetic induction.

The superconductor is also cooled over a layer of large surface area and small thickness, and this makes it more effective. Furthermore, the tube of insulating material covering the outside of the superconductive layer forms another stabilising element because of its thermal inertia. Finally, in a switch of this type, every point of the superconductive layer is subjected simultaneously to a magnetic induction of the same value so that the material operates under the same conditions throughout. It is therefore possible for the switch to make rapid, uniform and complete transitions while obtaining the maximum normal electrical resistance with a uniform distribution of the electric field along the layer during the transition, without any danger of breakdown or damage on switching involving high electrical power.

The second terminal of the switch 16 remote from the terminal connected to the conductor 15, is connected to a conductor 19 of the same general structure as the element 11, the conductor 19 extending through a second junction member 20 together with the second end 21 of the conductive element 11. The junction member 20 preferably consists of two halves **20*a* and 20*b* made from a metal having a very low electrical resistivity, more particularly copper, the said halves being reinforced by an outer frame if necessary. Inside the halves, which are clamped together, the conductors 19 and 21 are in close contact by their outer surface which at this place has no insulating sheathing. Furthermore, a wire or cable 22 similar to cable 17 is brazed to one of the halves of the junction member before assembly and allows the circuit of the conductive element 11 to be electrically connected to an external circuit (not shown). At their outlet from the junction member, the two conductors 19 and 21 have ends 23 and 24** such that they can be mechanically connected to a self-contained pumping unit which provides the required flow of cooling fluid in the complete circuit.

Figure 5:
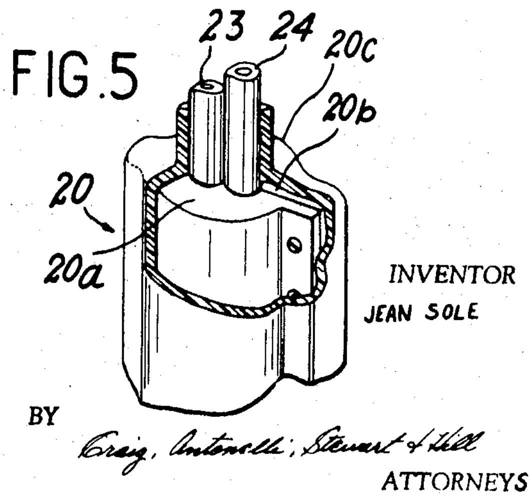

The outside of the junction member 20 is covered with a suitable layer **20*c* (FIG. 5) of an electrically and thermally insulating material which may be the same as or different from the material forming the outer covering 4 of the conductive element 11** so as to ensure continuity of the insulation of the circuit and avoid any cold loss which might occur through the metal of the junction member if no such insulating layer were provided.

Figure 6:
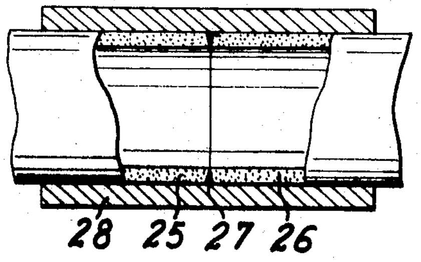
FIGS. 5 and 6 are details to an enlarged scale, showing the electrical connection made in the circuit according to FIG. 1, firstly between the ends of this circuit and secondly between any two portions of the conductive element.

Irrespective of the type of embodiment used for the conductive element 11 forming the coil 10, and particularly when the total length of the conductive element is considerable, it may be necessary to make a number of intermediate connections to the superconductive circuit. To this end, and as shown in FIG. 6, the ends 25 and 26 of two lengths of adjacent superconductors may be connected by making, more particularly, an indium weld 27 at their contacting regions, the two ends then being enclosed in a common sleeve 28 of a metal which is a good conductor, in accordance with the features already described. The object of the weld 27 is to provide continuity of the circuit for the passage of the cooling fluid while the sleeve 28 ensures electrical continuity of the same circuit.

Electrically, the circuit formed by the conductive element 11 and the switch 16 is closed on itself. The junction members 14 and 20 in no way affect the integral nature of this circuit which can be connected by the connections 17 and 22 to an external circuit whereby electrical power can be introduced into the coil 10 by trapping a given current, or else such power can be recovered. The method used for this purpose is conventional and comprises electrically opening or closing the switch 16 by changing the state of the superconductive material from which it is formed, the external circuit then being connected in parallel to the coil 10 by the junction members 14 and 20 and the connections 17 and 22. On the other hand, when the switch 16 is closed, these non-superconductive metal junction members introduce only a very small resistance into the superconductive circuit.

Figure 7:
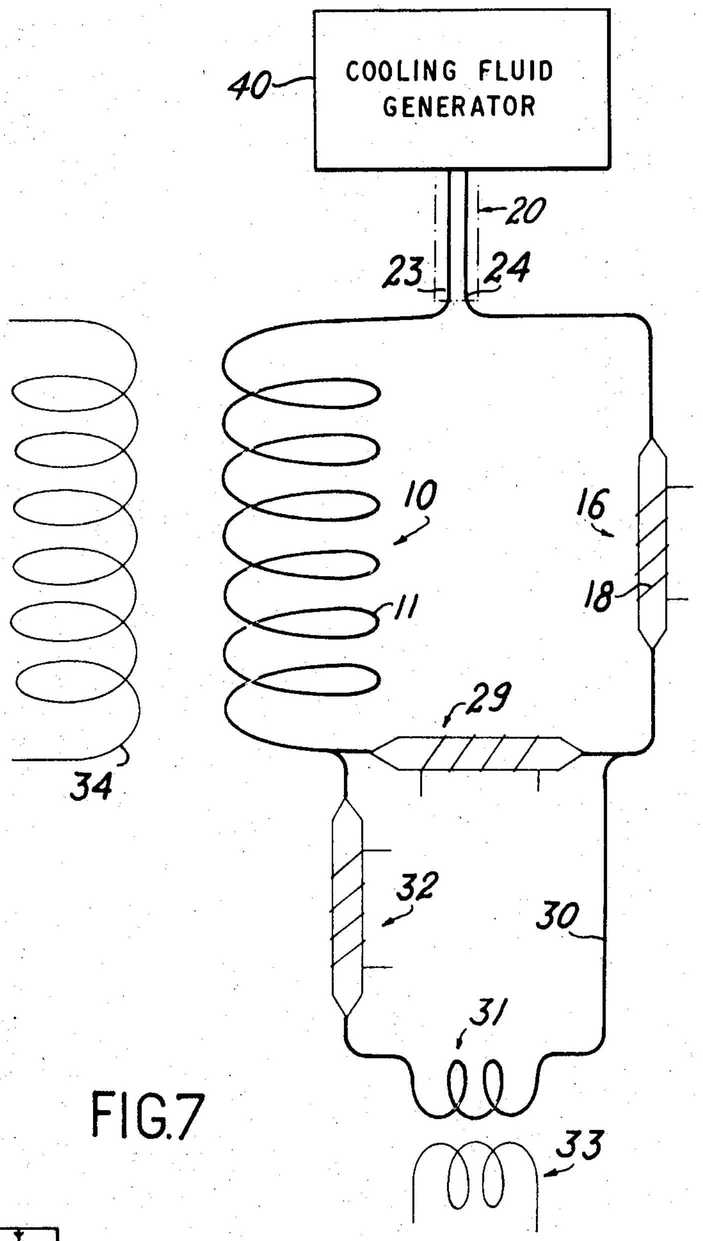
FIG. 7 is a schematic diagram of another circuit in which electrical power is introduced and released without direct connections to the said circuit.

In another modified embodiment of the superconductive circuit according to the invention, of which FIG. 7 illustrates a schematic diagram, electrical power is introduced into and then released from the coil 10 without direct electrical connections being made between this superconductive circuit and the associated load and utilization circuits, more particularly by simply eliminating the conductors 17 and 22 provided in the embodiment shown in FIG. 1.

Various methods may be used for this purpose, more particularly the one described in French Pat. No. 1,522,300, by providing a second superconductive switch 29 preferably similar to the above-mentioned switch 16 in the said circuit. At the terminals of the switch 29 the circuit comprises a branch 30 containing a coupling winding 31 and a third switch 32. The coupling winding 31 is associated with a second winding 33 to form a superconductive transformer. Under these conditions and in accordance with the features of the above-mentioned patent, combined and successive opening and closing of the switches 29 and 32 enable an electrical current to be introduced into the superconductive circuit, and more particularly the coil 10, and this electrical current is maintained in this circuit without any power losses. In order subsequently to release the power, an external winding 34 may be inductively coupled to the coil 10, the winding 34 having suitably associated turns which are preferably interspersed with those of the superconductive coil 10. More particularly, any of the configurations referred to in U.S. patent application Ser. No. 654,104 filed on July 18, 1967 may be used.

In every case, the superconductive circuit formed by the element 11 has its ends connected by the junction member 20 which solely provides the electrical connection in the manner already indicated, while its ends are left free as regards the flow of cooling fluid from cooling fluid generator 40. The length of the junction member 20 must be sufficient firstly to prevent any flow through the surfaces that it brings into contact (the two halves and the conductive elements 19 and 21) of current densities which might result in a local temperature rise likely to result in the changeover of the superconductive material from which these elements are made, and secondly so that the electrical resistance of the said junction is sufficiently low for the discharge time constant of the power stored in the coil 10 to be long enough with respect to the time for which it is required to retain the stored power. The power loss resulting at the contact resistance of the junction member should in fact be negligible. If necessary, the two halves providing the junction of the conductor elements 19 and 21 may themselves be formed like the other elements of the circuit from alternate layers of metal which is a good conductor and superconductive materials. Also, these halves may or may not be indium-welded to the conductive elements 19 and 21, and such welds can be made at a temperature low enough not to damage the superconductive parts.

Cryogenically, the circuit formed by the conductive element 11, the switch 16 and the junction members 14 and 20 forms one or more continuous conduits for the flow of a cooling fluid passing through the circuit via the end 23 and leaving via the end 24.

Under these conditions, as a result of the junction member 20 which closely connects the conductive elements 19 and 21 by their contacting surfaces while leaving them independent as regards the flow of cooling fluid, the ends of the circuit are continually kept at the same electrical potential and this applies irrespective of the state of the circuit, open or closed, completely superconductive or under total or local transition.

The cooling fluid cannot in any case produce short-circuits resulting in electrical breakdown between the coil 10 and the external pumping unit (not shown) connected to the ends 23 and 24 for the flow of cooling fluid, which may be a forced flow if required. In the exemplified embodiment shown in FIG. 1, in fact, the junction member 20 can be earthed via the connection 22 and the ends 23 and 24 can be connected without any danger to an installation of the type mentioned hereinbefore, to give correct operation irrespective of the voltages developed between the members 14 and 20 when the power stored in the coil 10 is released.

Figure 8:
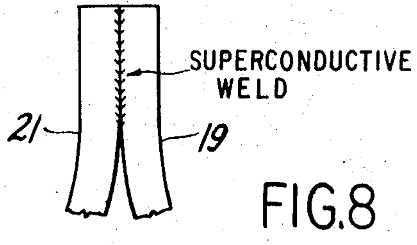
FIG. 8 shows a modified form of the connection of superconductive conductors without the junction member shown in FIG. 1.

Of course the invention is not limited just to the examples described and illustrated, but on the contary covers all modifications thereof. More particularly, the complete circuit could be externally insulated by an adequate thickness of a suitable insulating material, so that no casing would be required, the outer surface of the insulating material being directly in contact with the ambient air and the cooling fluid being delivered by a self-contained generator. Other modifications could also be considered, more particularly for the embodiment of superconductive transformer circuits and for the construction of flow pump circuits whereby power can be introduced into any superconductive coil. Finally, a direct weld could also be made to the ends of the conductive element devoid of insulating sheathing, as is shown in FIG. 8, and this eliminates the need to use the said two metal half-members.

What is claimed is:

1. A superconductive circuit, characterised in that it comprises at least one winding of a conductive element of superconductive material having an outer electrically insulating sheathing, the said element being in the form of a continuous hollow tube in which a cooling fluid flows in the immediate vicinity of the said superconductive material, and a member for electrically connecting the ends of the said element, said member connecting the said ends by their outer surface where there is no sheathing and leaving the inlet and outlet for the said cooling fluid for the said element independent of one another.

2. A superconductive circuit according to claim 1, characterised in that it comprises at least one superconductive switch connected in series and being in the form of a hollow tube which the cooling fluid also flows.

3. A superconductive circuit according to claim 1, characterised in that the said conductive element is in the form of a hollow tube of superconductive material covered on the outside by a sheath of an electrical and thermal insulant and the inner surface of which is in contact with a cylindrical cover consisting of a metal having a high coefficient of thermal conductivity, the said cover bounding an axial duct intended for the flow of cooling fluid.

4. A superconductive circuit according to claim 3, characterised in that the said conductive element is formed from a number of alternate layers of superconductive material and metal having a high coefficient of thermal conductivity.

5. A superconductive circuit according to claim 1, characterised in that the said conductive element comprises a hollow tube of superconductive material covered on the outside by an electrical and thermal insulant surrounding a solid core of a metal having a high coefficient of thermal conductivity, said core being formed with a number of parallel bores intended for the flow of cooling fluid.

6. A superconductive circuit according to claim 1, characterised in that the said element is in the form of a hollow tube of superconductive material covered on the outside by a metal cover enabling mechanical connections to be made between adjacent lengths of conductors.

7. A superconductive circuit according to claim 1, characterised in that the said electrical connecting member for the ends of the said conductive element is formed from two halves made from a metal having a low electrical resistivity and secured to one another so as to apply the said ends against one another.

8. A superconductive circuit according to claim 6, characterised in that the system formed by the said halves is covered by an insulating sheathing.

9. A superconductive circuit according to claim 1, characterised in that the electrical connecting member consists of a weld of superconductive material to the said ends devoid of insulating sheathing.

10. A superconductive circuit according to claim 1, characterised in that the ends of the said conductive element are connected to a self-contained cooling fluid generator.

References Cited

UNITED STATES PATENTS 3,292,016 12/1966 Kafka ---------- 335—216UX

GEORGE HARRIS, Primary Examiner

U.S Cl. X.R.

335—300; 336—62